(12) United States Patent
Matsumoto et al.

(10) Patent No.: US 6,796,721 B2
(45) Date of Patent: Sep. 28, 2004

(54) OPTICAL CONNECTOR

(75) Inventors: Shinichi Matsumoto, Tokyo (JP); Masato Shiino, Tokyo (JP); Hideki Miyazaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/295,462

(22) Filed: Nov. 15, 2002

(65) Prior Publication Data
US 2003/0095754 A1 May 22, 2003

(30) Foreign Application Priority Data

Nov. 15, 2001 (JP) ........................................ 2001-350305
Aug. 7, 2002 (JP) ........................................ 2002-230171

(51) Int. Cl.[7] ................................................ G02B 6/36
(52) U.S. Cl. .............................. 385/86; 385/58; 385/56; 385/60; 385/78
(58) Field of Search ............................. 385/86, 58, 56, 385/60, 78

(56) References Cited

U.S. PATENT DOCUMENTS

| | | | | |
|---|---|---|---|---|
| 5,719,977 A | * | 2/1998 | Lampert et al. | 385/60 |
| 5,887,100 A | * | 3/1999 | Robertson | 385/76 |
| 2001/0055451 A1 | * | 12/2001 | Kuhara et al. | 385/93 |
| 2002/0015564 A1 | * | 2/2002 | Asada et al. | 385/72 |
| 2002/0076164 A1 | * | 6/2002 | Childers et al. | 385/76 |
| 2002/0118926 A1 | * | 8/2002 | Shimoji et al. | 385/76 |
| 2002/0168149 A1 | * | 11/2002 | Nakura et al. | 385/59 |
| 2002/0191919 A1 | * | 12/2002 | Nolan | 385/78 |
| 2003/0021546 A1 | * | 1/2003 | Sato | 385/78 |
| 2003/0095779 A1 | * | 5/2003 | Chang | 385/140 |
| 2003/0156796 A1 | * | 8/2003 | Rathnam et al. | 385/55 |

* cited by examiner

Primary Examiner—Jared J. Fureman
Assistant Examiner—Allyson N. Trail
(74) Attorney, Agent, or Firm—Cohen, Pontani, Lieberman & Pavane

(57) ABSTRACT

An optical connector has a housing in which a ferrule and a stopper are arranged on the front side and the rear side of the housing, respectively. An optical fiber ribbon extends from the ferrule through the stopper engaged with the housing and comes out from the rear end of the housing. A protection boot extends from the rear end of the housing over a predetermined length. The protection boot surrounds the optical fiber ribbon. The protection boot has a front end mounted on the stopper inside the housing.

8 Claims, 7 Drawing Sheets

OPTICAL CONNECTOR

BACKGROUND OF THE INVENTION

1. Field of the Invention

The present invention relates to an optical connector for connecting optical fibers.

2. Description of the Art

In a relay station of an optical communication system or the like, optical fiber cables are connected by means of optical connectors. Specifically, a relay station has an optical communication apparatus which is held on a rack. An optical fiber cable which is brought from behind the rack is bent near the rear plate of the optical communication apparatus, and then connected to the apparatus by means of an optical connector. More specifically, an optical connector of the optical fiber cable is connected to an optical connector of another optical fiber cable which the optical communication apparatus has.

When the optical fiber cable is bent, not only damage of the optical fiber cable but also optical transmission loss needs to be prevented. For this, the radius of curvature of a bent portion of the optical fiber cable needs to be kept 30 mm or more.

Thus, from the optical connector of the optical fiber cable extends a flexible protection boot, which surrounds the portion of the optical fiber cable which is adjacent to the optical connector, over a predetermined length. The protection boot prevents the optical fiber cable from being bent too much, so that the radius of curvature of the bent portion of the optical fiber cable is kept within the above-mentioned allowable range and damage of the optical fiber cable is prevented.

For the above reason, behind the rear plate of the optical communication apparatus, space of, for example, about 80 mm is kept to accommodate the optical connector and the protection boot.

OBJECT AND SUMMARY OF THE INVENTION

An object of the present invention is to provide an optical connector which can reduce the above-mentioned space and prevent the optical transmission loss and damage by bending of an optical fiber cable.

In order to achieve the above object, an optical connector according to the present invention comprises: a housing having a front open end and a rear open end; a ferrule arranged in the housing on a front open end side of the housing, the optical fiber cable being connected with the ferrule at one end by means of an optical fiber of the cable and extending out of the housing through the rear open end; a holding assembly for holding the ferrule in the housing, the holding assembly including a stopper arranged in the housing on a rear open end side of the housing; and a protection boot adapted to surround the optical fiber cable over a predetermined length from the rear open end of the housing, the protection boot having a front end adapted to engaged with the stopper inside the housing, and having flexibility which restricts bending of the optical fiber cable to an allowable limit.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the invention herein described.

First Embodiment

Figure 1:
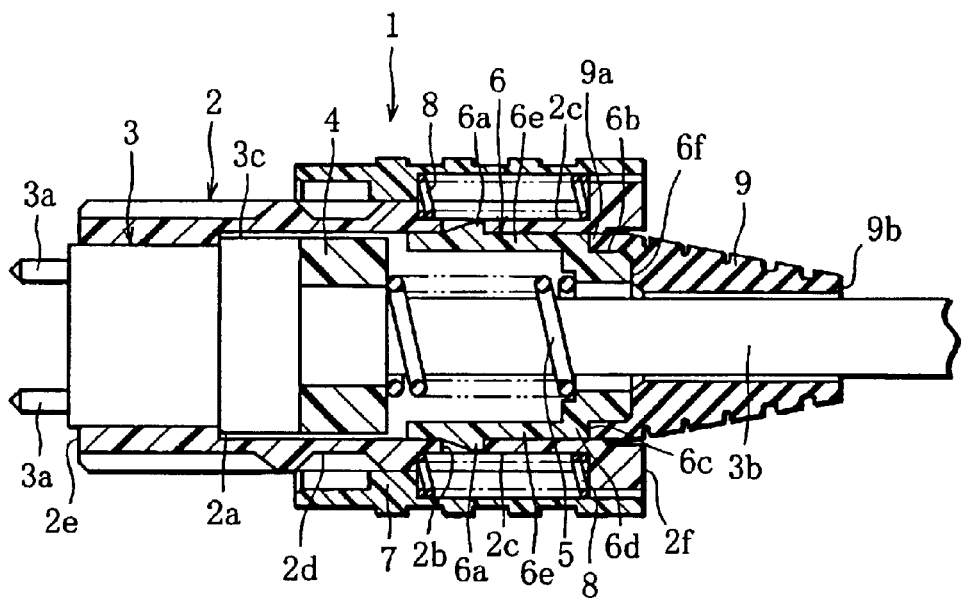
FIG. 1 is a cross-sectional view of an optical connector according to a first embodiment of the present invention.

As shown in FIG. 1, an optical connector 1 has a housing 2. The housing 2 has a front open end 2e and a rear open end 2f. The housing 2 holds a ferrule 3 and a holding assembly for the ferrule 3. The ferrule 3 is inserted into the front open end 2e. It is to be noted that the ferrule 3 projects a little beyond the front open end 2e.

The holding assembly comprises a pin holder 4 having a pair of guide pins 3a, a compression coil spring 5 and a stopper 6, which are located in this order, from the ferrule 3 side.

A slider 7 is mounted on the housing 2, and a protection boot 9 extends from the rear open end 2f of the housing 2.

To the ferrule 3 is connected an optical fiber cable, that is, an optical fiber ribbon (hereinafter referred to simply as "fiber ribbon") 3b. The fiber ribbon 3b extends from the ferrule 3 through the housing 2 and the protection boot 9, outward. More specifically, inside the housing 2, the fiber ribbon 3b extends through the pin holder 4 and the stopper 6.

The front part of the ferrule 3, guide pins 3a, slider 7 and housing 2 has a size which complies with the size of an MPO (multifiber push on) connector which meets the Japanese Industrial Standards.

The housing 2 is in the shape of a hollow box, and made of synthetic resin such as PBT (polybutylene terephthalete), PPS (polyphenylene sulfide), or the like. The inner circumferential surface of the housing 2 has a step 2a, which is located on the front open end 2e side. On the step 2a abuts a flange 3c of the ferrule 3. Thus, the step 2a prevents the ferrule 3 from coming out from the front open end 2e of the housing 2.

Each of side-walls of the housing 2 has a fitting hole 2b formed in the inner surface thereof, and a longitudinal groove 2c formed in the outer surface thereof. Each of longitudinal grooves 2c is located in a rear part of the housing 2, and extends in the longitudinal direction of the housing 2. Fitting holes 2b open into the bottoms of longitudinal grooves 2c, respectively.

The slider 7 and each longitudinal groove 2c of the housing 2 define a spring holding chamber. In each spring holding chamber is held a compression coil spring 8. The compression coil springs 8 press the slider 7 toward the front open end 2e of the housing 2.

Each of side-walls of the housing 2 has further a fitting groove 2d formed in the outer surface thereof. The fitting grooves 2d extend in an area nearer the front open end 2e of the housing 2, as compared with the longitudinal grooves 2c.

An adapter (not shown) is used to optically connect the optical connector with a mate optical connector (not shown). When the front part of the housing 2 is inserted into the adapter into which the mate optical connector is fitted, the fitting grooves 2d can receive projections of engaging arms integrally formed on the adapter. When the slider 7 is in a position shown in FIG. 1, each projection of the adapter is held between the fitting groove 2d and the front end part of the slider 7, and thus kept fitted in the fitting groove 2d. When the slider 7 is slid to the right in FIG. 1, against the pressing force of the compression coil springs 8, the projections of the adapter come outside the slider 7, and thus get released from the fitting grooves 2d. As a result, the optical connectors can be separated from each other.

Like the housing 2, the above-mentioned stopper 6 is made of synthetic resin such as PBT, PPS, or the like. The stopper 6 has a rectangular end wall 6d. The end wall 6d has an inner face which faces toward the inside of the housing 2, and an outer face which faces toward the outside of the housing 2. From each side-edge of the inner face of the end wall 6, a fitting arm 6e extends toward the pin holder 4. Each fitting arm 6e has a claw 6a on the outer surface thereof. Each claw 6a is fitted in the corresponding fitting hole 2b of the housing 2.

From the outer face of the end wall 6d projects a rectangular boss 6b, and the outer face of the end wall 6d is intended to function as an annular stopping surface 6c.

The boss 6b of the stopper 6 is inserted into the front end part 9a of the protection boot 9, where the front end part 9a abuts on the stopping surface 6c of the stopper 6.

The above-mentioned compression coil 5 is arranged between the pin holder 4 and the end wall 6d of the stopper 6 and presses the pin holder 4 and the stopper 6 in the opposite directions. As a result, the ferrule 3 is pressed against the step 2a by the pin holder 4, while each claw 6a of the stopper 6 is pressed against the end face of the corresponding fitting hole 2b of the housing 2. Thus, as is clear from FIG. 1, the stopper 6 is kept engaged with the housing 2, and prevents the ferrule 3, pin holder 4 and coil spring 5 from coming out of the housing 2.

It is to be noted that when the stopper 6 is engaged with the housing 2 as described above, the boss 6b of the stopper 6 is located on the inside of the rear open end 2f of the housing 2.

The guide pins 3a of the pin holder 4 extend through the ferrule 3 and projects beyond the front end face of the ferrule 3.

The ferrule 3 is one which is called a MT (mechanically transferable) ferrule, and has a multi-capillary structure. The end portions of a plurality of optical fibers in the fiber ribbon 3b are connected with the ferrule 3. Specifically, after coatings are removed from the end portions of the optical fibers, the end portions are inserted into the capillaries of the ferrule 3 and stuck to the ferrule 3 using adhesive. The end faces of the optical fibers are exposed at the front end face of the ferrule 3.

Figure 2:
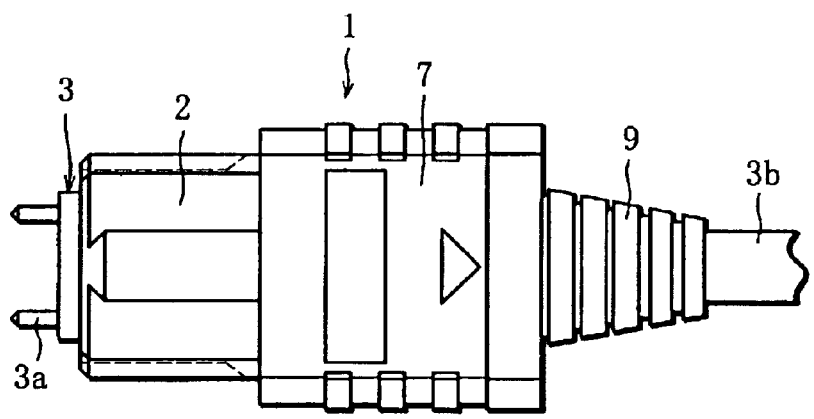
FIG. 2 is a plan view of the optical connector of FIG. 1.
Figure 3:
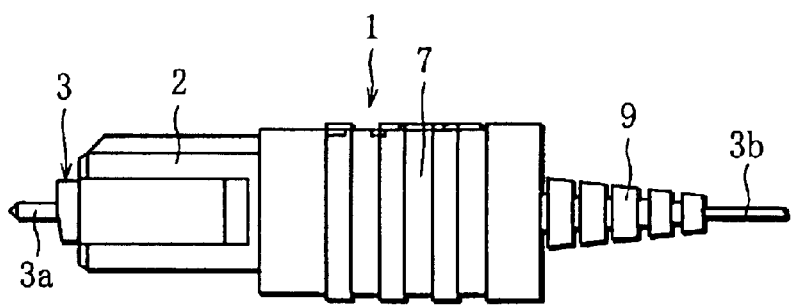
FIG. 3 is a side view of the optical connector of FIG. 1.

The above-mentioned protection boot 9 is made of, for example, elastomer, and has desired flexibility. However, the flexural-rigidity of the protection boot 9 needs to be sufficiently higher than that of the fiber ribbon 3b. As is clear from FIGS. 1 to 3, the protection boot 9 is a tube which is rectangular in cross section, and has a front end 9a and a rear end 9b. The front end 9a is larger than the rear end 9b, and the protection boot 9 tapers from the front end 9a to the rear end 9b. Further, as is clear from FIG. 1, except for the front end 9a, the wall thickness of the protection boot 9 becomes gradually smaller toward the rear end 9b.

The front end 9a of the protection boot 9 has a recess which can receive the boss 6b of the stopper 6. The boss 6b of the stopper 6 is fitted in the recess, where the front end 9a of the protection boot 9 abuts on the stopping surface 6c while the end face of the boss 6b abuts on the bottom of the recess of the protection boot 9. The stopper 6 prevents the protection boot 9 from moving to the inside of the housing 2.

The recess of the front end 9a is somewhat smaller than the boss 6b of the stopper 6. Hence, when the boss 6b is fitted into the front end 9a of the protection boot 9, the front end 9a undergoes elastic deformation and sticks to the boss 6b. Thus, the protection boot 9 cannot easily come off the stopper 6. The boss 6b of the stopper 6 and the front end 9a of the protection boot 9 may be stuck together using adhesive. In that case, the protection boot 9 cannot come off the stopper 6.

In the case of the above-described optical connector 1, when bending force is applied to the fiber ribbon 3b, the protection boot 9 which surrounds the fiber ribbon 3b receives bending transformation, together with the fiber ribbon 3b. However, the flexibility of the protection boot 9 is lower than that of the fiber ribbon 3b. Thus, the protection boot 9 restricts the bending of the fiber ribbon 3b to the limit which the flexibility of the protection boot 9 allows. As a result, even when the fiber ribbon 3b is bent, the radius of curvature of the bending of the fiber ribbon 3b is kept equal to or larger than the above-mentioned allowable value, so that damage of the optical fibers in the fiber ribbon 3b is surely prevented.

Since the front end 9a of the protection boot 9 is mounted on the boss 6b of the stopper 6, the front end 9a of the protection boot 9 is located on the inside of the rear open end 2f of the housing 2. Hence, the protection boot 6 undergoes bending transformation which emerges from the front end portion thereof inside the housing 2. Thus, even when there is not sufficient space to bend the fiber ribbon 3b behind the optical connector 1, the fiber ribbon 3b can extend from the optical connector 1 in a state that the bending of the fiber ribbon 3b is restricted by the protection boot 9.

Second Embodiment

Figure 4:
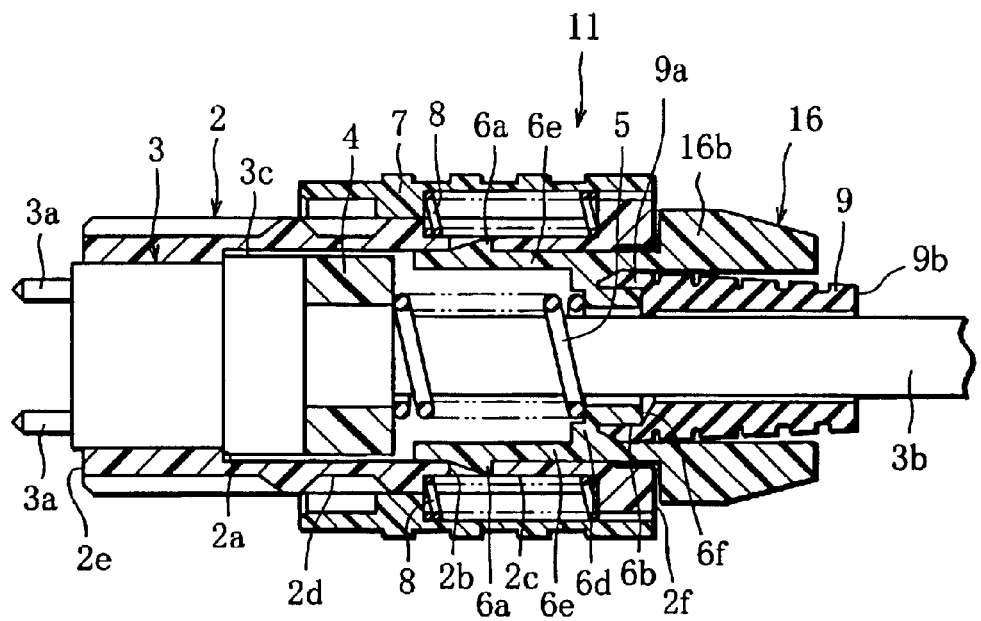
FIG. 4 is a cross-sectional view of an optical connector according to a second embodiment.
Figure 5:
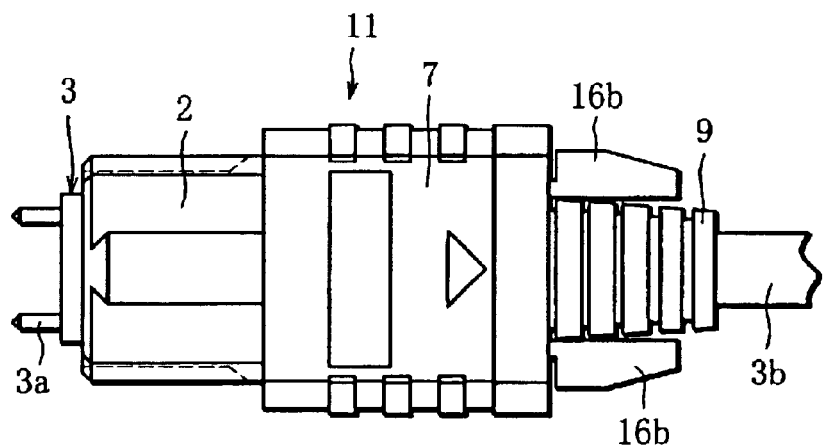
FIG. 5 is a plan view of the optical connector of FIG. 4.
Figure 6:
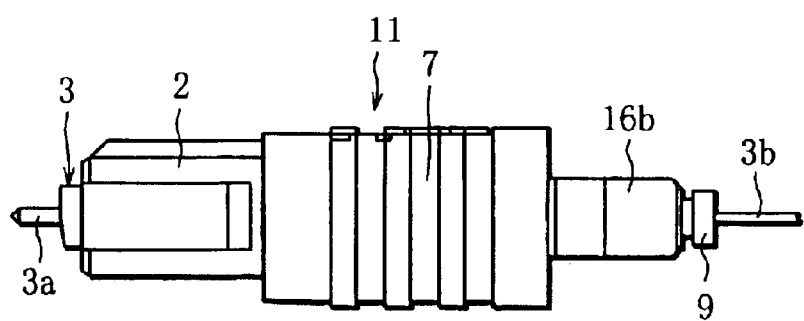
FIG. 6 is a side view of the optical connector of FIG. 4.

Next, an optical connector 11 according to a second embodiment will be described with reference to FIGS. 4 to 6.

The optical connector 11 has a stopper 16 in place of the stopper 6. As is clear from FIG. 4, the stopper 16 has two protection arms 16b which project beyond the rear open end 2f of the housing 2. The two protection arms 16b extend from the end wall 6d of the stopper 16, and they are on the opposite sides of the protection boot 9 relative to the width thereof. More specifically, the two protection arms 16b extend along both side-edges of the fiber ribbon 3b, and the arms 16b are so arranged as to allow the fiber ribbon 3b and the protection boot 9 to bend. When the boss 6b of the stopper 16 is fitted into the front end 9a of the protection boot 9, the proximal portion of each protection arms 16b and the boss 6b can firmly hold the front end 9a of the protection boot 9 between.

Also in the second embodiment, the boss 6b of the stopper 16 is located inside the housing 2.

It is preferable that the gap between the proximal portion of each protection arm 16b and the boss 6b is smaller than the wall thickness of the front end 9a of the protection boot 9. In this case, the front end 9a of the protection boot 9 undergoes compressive deformation between the proximal portion of each protection arm 16b and the boss 6b, which makes it less probable that the protection boot 9 will come off the stopper 16. Thus, it is preferable that the gap becomes narrower toward the end wall 6d of the stopper 16, as shown in FIG. 4. In this case, the front end 9a of the protection boot 9 is firmly held by the stopper 16. The front end 9a of the protection boot 9 may be stuck to the boss 6b and the proximal portion of each protection arm 16b of the stopper 16, using adhesive.

In the second embodiment, the flexural-rigidity of the protection arms 16b is approximately equal to or higher than that of the protection boot 9. Thus, when the slider 7 is slid toward the rear of the housing 2 in order to connect the optical connector 11 with a mate connector or separate them from each other, a worker can hold the optical connector 11 by grasping the two protection arms 16b, without exerting the holding force on the protection boot 9 or the fiber ribbon 3b. As a result, the connection of the optical connectors can keep stable for a long time, and the reliability of the optical connector 11 improves.

Third Embodiment

Figure 7:
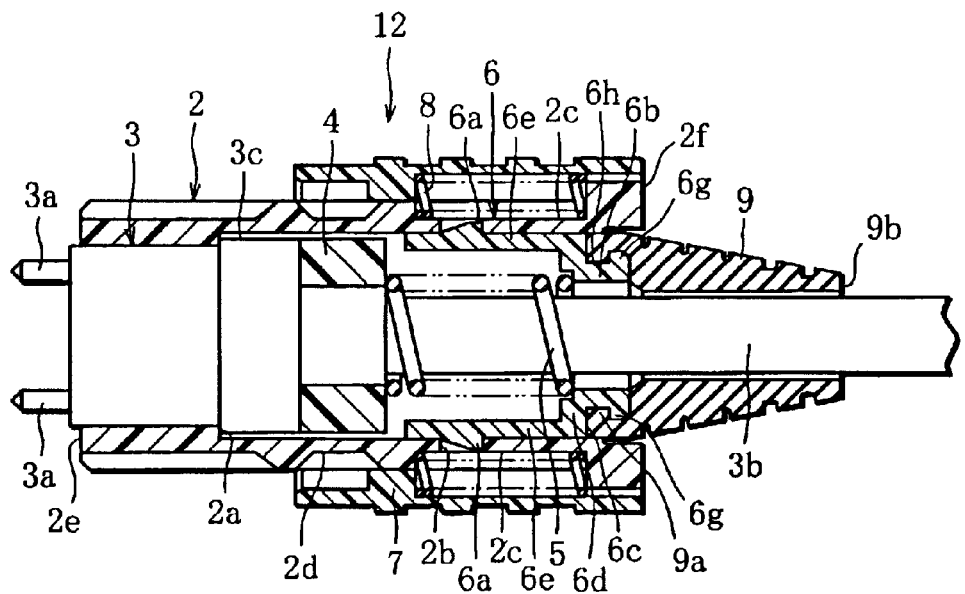
FIG. 7 is a cross-sectional view of an optical connector according to a third embodiment.

FIG. 7 shows an optical connector 12 according to a third embodiment.

The stopper 6 of the optical connector 12 has an enlarged diameter portion 6g at the end of the boss 6b thereof. The enlarged diameter portion 6g and the end wall 6d of the stopper 6 together form an annular groove 6h. The protection boot 9 has an inner flange at the front end 9a thereof. The inner flange is fitted into the annular groove 6h.

In the case of the optical connector 12, since the inner flange of the protection boot 9 is fitted into the annular groove 6h of the stopper 6, the connection between the stopper 6 and the protection boot 9 is more sure as compared with the first and second embodiments. However, the inner configuration of the front end 9a of the protection boot 9 requires complicated molds for injection-molding the protection boot 9.

Fourth Embodiment

Figure 8:
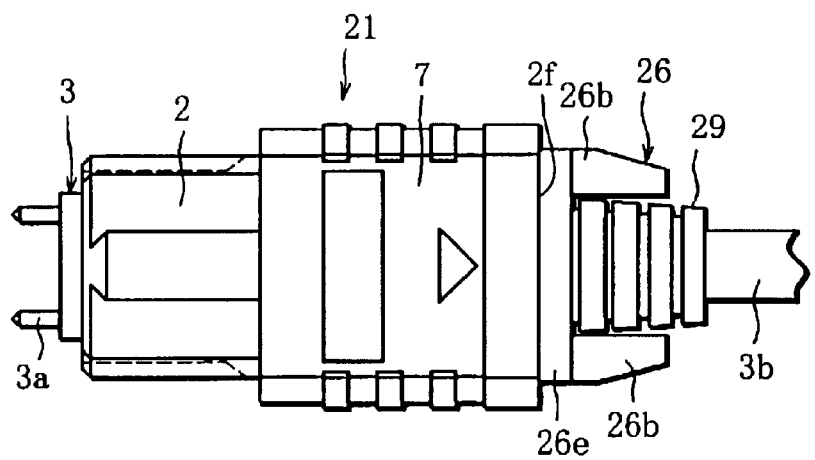
FIG. 8 is a plan view of an optical connector according to a fourth embodiment.
Figure 9:
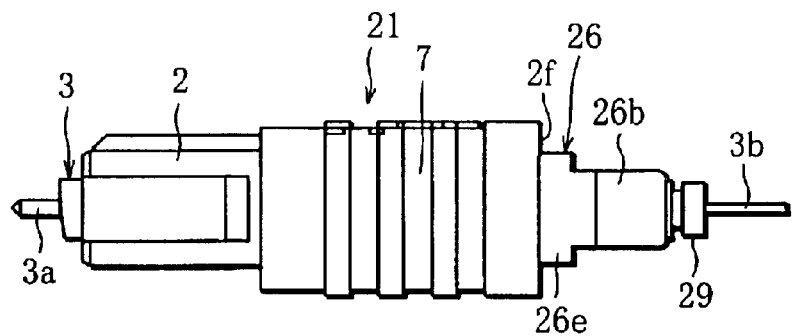
FIG. 9 is a side view of the optical connector of FIG. 8.

FIGS. 8 and 9 show an optical connector 21 according to a fourth embodiment. The optical connector 21 overcomes the above-mentioned drawback of the third embodiment.

The optical connector 21 has a stopper 26 in place of the above-mentioned stopper 6 or 16, and a protection boot 29 in place of the above-mentioned protection boot 9.

Figure 10:
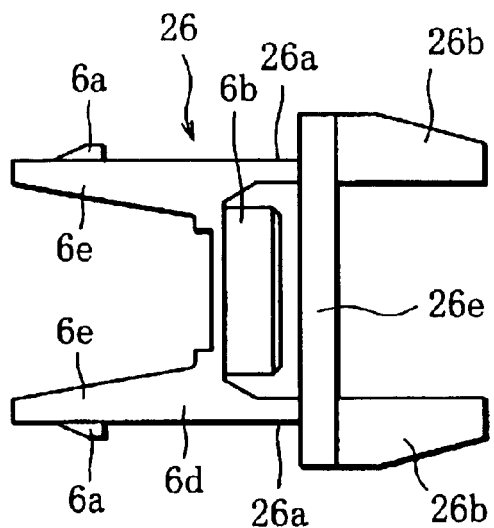
FIG. 10 is a plan view of a stopper arranged in the optical connector of FIG. 8.

As shown in FIG. 10, the stopper 26 has a pair of protection arms 26b which is similar to the pair of protection arms 16b. The two arms 26b are arranged on both sides of the boss 6b, and extend beyond the boss 6b to the outside of the housing 2.

The two protection arms 26b are connected to each other by a support plate 26e. The support plate 26e extends parallel to the end wall 6d of the stopper 26. More specifically, as is clear from FIGS. 8 and 9, the support plate 26e is arranged in a manner that the support plate 26e closes the rear open end 2f of the housing 2 from the outside of the housing 2.

Figure 11:
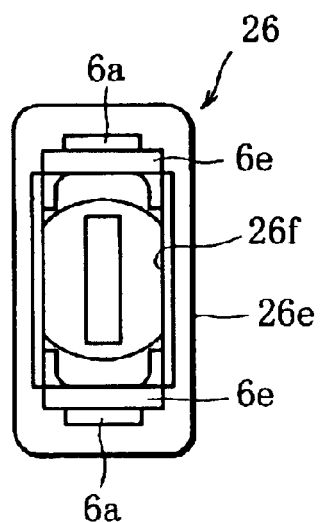
FIG. 11 is a front view of the stopper of FIG. 10.
Figure 12:
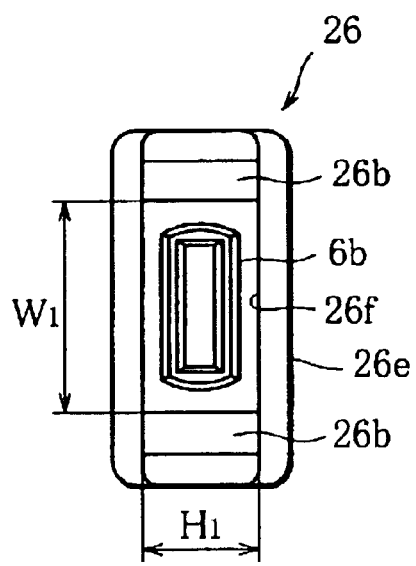
FIG. 12 is a rear view of the stopper of FIG. 10.

FIGS. 11 and 12 are a front view and a rear view of the stopper 26, respectively.

As is clear from FIG. 12, the support plate 26e has a rectangular through-hole 26f. In FIG. 12, reference signs W1 and H1 represent the opening width and opening height of the through-hole 26f, respectively.

Figure 13:
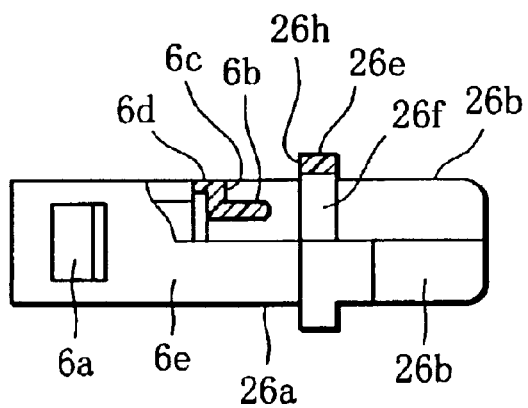
FIG. 13 is a partly broken plan view of the stopper of FIG. 10.

FIG. 13 is a partly broken side view of the stopper 26. As shown in FIG. 13, the inner face of the support plate 26e which faces the boss 6b is intended to function as an abutting surface 26h.

Figure 14:
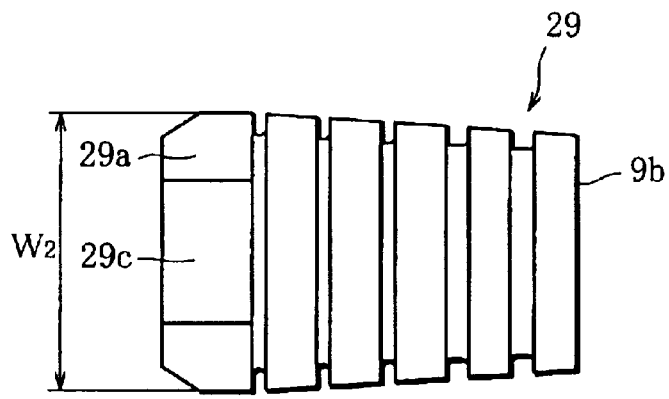
FIG. 14 is a plan view of a protection boot included in the optical connector of FIG. 8.
Figure 15:
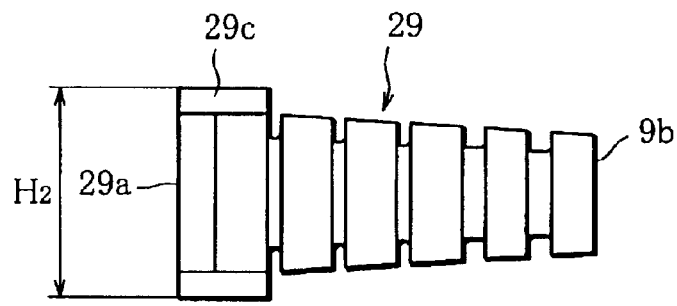
FIG. 15 is a side view of the protection boot of FIG. 14.

As shown in FIGS. 14 and 15, where reference signs W2 and H2 represent the maximum width and maximum height of a front end 29a of the protection boot 29, respectively, the maximum width W2 is somewhat smaller than the opening width W1 of the through-hole 26f while the maximum height H2 is larger than the opening height H1 of the through-hole 26f.

Specifically, on the outer circumferential surface of the front end 29a of the protection boot 29, a pair of convex portions 29c is formed integrally. Each convex portion 29c describes a circular arc in the circumferential direction of the front end 29a. The pair of convex portions 29c determines the maximum height H2 of the front end 29a.

Each convex portion 29c has a length which extends from the front end face of the protection boot 29 in the longitudinal direction of the protection boot 29. The length of the convex portion 29c is somewhat smaller than the distance between the stopping surface 6c of the end wall 6d of the stopper 26 and the abutting surface 26h.

Figure 16:
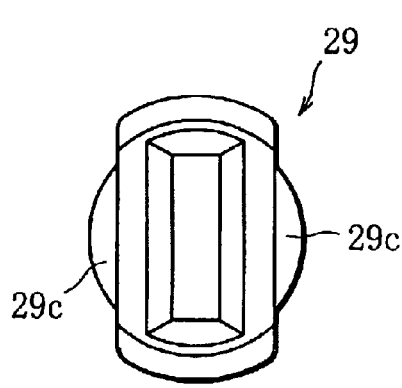
FIG. 16 is a front view of the protection boot of FIG. 14.
Figure 17:
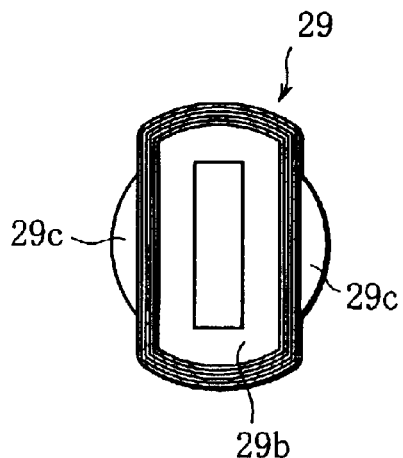
FIG. 17 is a rear view of the protection boot of FIG. 15.
Figure 18:
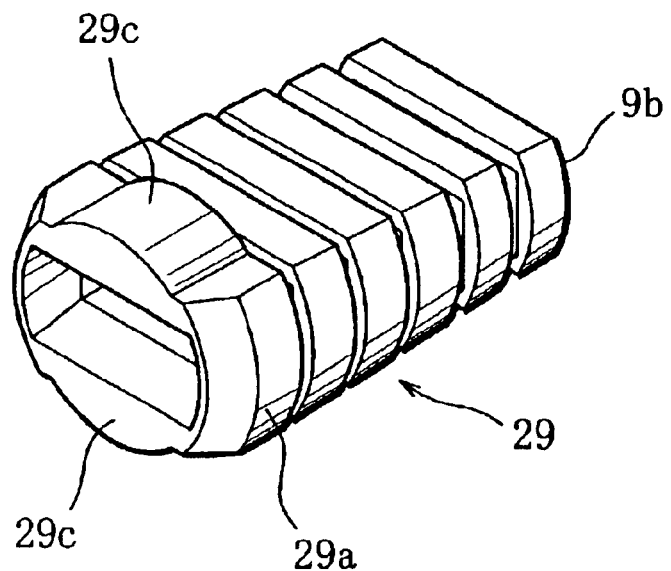
FIG. 18 is a perspective view of the protection boot of FIG. 14.

FIGS. 16 and 17 are a front view and a rear view of the protection boot 29, respectively, and FIG. 18 is a perspective view of the protection boot 29.

In the case of the optical connector 21 according to the forth embodiment, the front end 29a of the protection boot 29 is inserted into the through-hole 26f of the support plate 26e from the protection arms 26b side of the stopper 26, and mounted on the boss 6b of the stopper 26. Since the maximum height H2 of the front end 29a of the protection boot 29 can become smaller due to elastic deformation, the front end 29a of the protection boot 29 can pass through the through-hole 26f.

Figure 19:
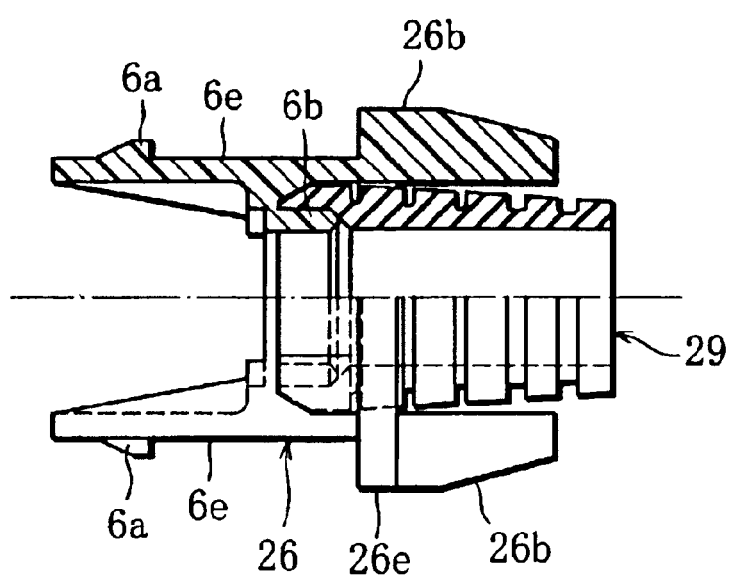
FIG. 19 is a partly broken plan view of an assembly consisting of the stopper and the protection boot of FIG. 8 fitted together.
Figure 20:
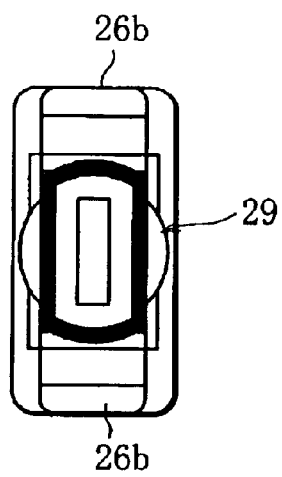
FIG. 20 is a rear view of the assembly of FIG. 19.
Figure 21:
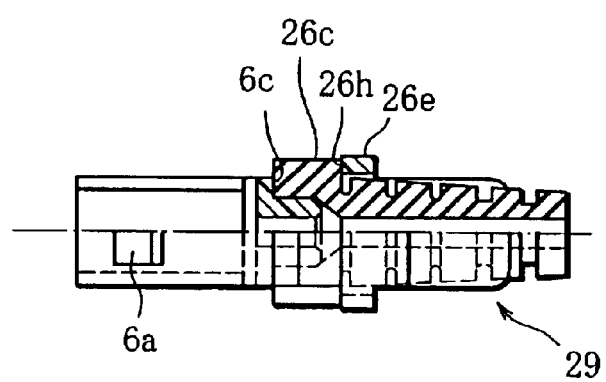
FIG. 21 is a partly broken side view of the assembly of FIG. 19.

After passing through the through-hole 26f, the front end 29a of the protection boot 29 is mounted on the boss 6b of the stopper 26 in the like manner, as shown in FIG. 19. The front end 29a of the protection boot 29 is compressed between the boss 6b and the proximal portion of each protection arm 26b. As shown in FIG. 20, the two protection arms 26b are located on the opposite sides of the protection boot 29.

After the front end 29a of the protection boot 29 has passed through the through-hole 26f of the support plate 26e, each convex portion 29a projects radially outward due to the restoration of the front end 29a. As a result, each convex portion 29a is firmly held between the end wall 6d (stopping surface 6c) of the stopper 26 and the support plate 26e (abutting surface 26h).

Thus, in the optical connector 21 according to the fourth embodiment, the front end 29a of the protection boot 29 engages with the stopper 26 in two ways. Hence, the protection boot 29 is connected with the stopper 26 so stably that the protection boot 29 will not come off the stopper 26.

Figure 22:
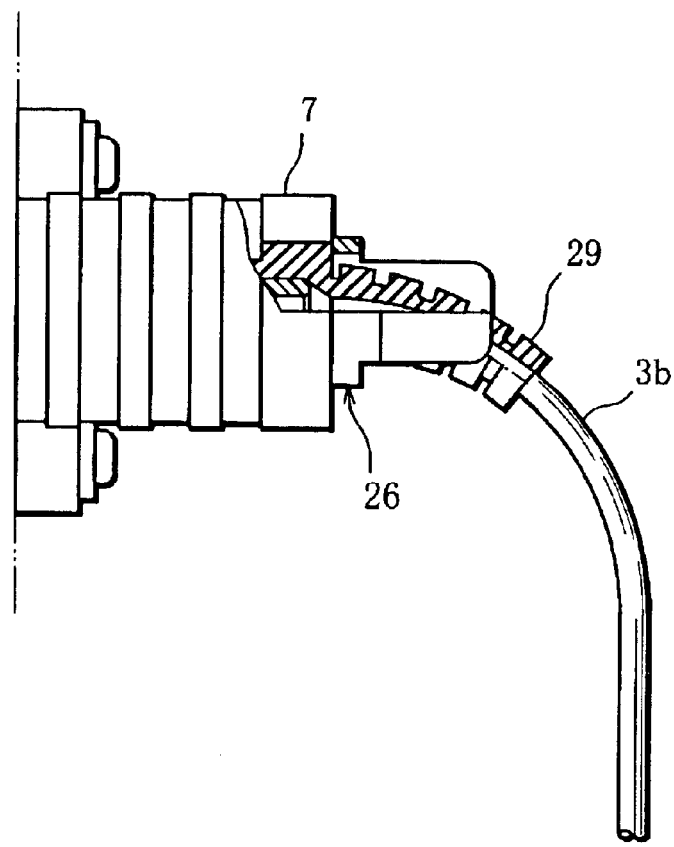
FIG. 22 is a (partly cross-sectional) view showing a state where an optical fiber cable connected with the optical connector of FIG. 9 is bent.

Also in the case of the optical connector 21, when bending force is applied to the fiber ribbon 3b, the protection boot 29 which surrounds the fiber ribbon 3b prevents the fiber ribbon 3b from bending excessively, as shown in FIG. 22. Thus, the optical connector 21 according to the fourth embodiment has the same advantages as the optical connectors according to the above-described other embodiments have.

It is to be noted that the present invention is not restricted to the above-described first to fourth embodiments. Modifications which do not deviate from the essence of the invention may be made to those embodiments.

What is claimed is:

1. An optical connector attached to an end of an optical fiber cable, the optical fiber cable including an optical fiber, the optical connector comprising:
   a housing having a front open end and a rear open end;
   a ferrule arranged in said housing on a front open end side of said housing, the optical fiber cable being connected with said ferrule at one end thereof by means of the optical fiber and extending out of said housing through the rear open end;
   a holding assembly for holding said ferrule in said housing, said holding assembly including a stopper arranged in said housing on a rear open end side of said housing; and
   a protection boot adapted to surround the optical fiber cable over a predetermined length from the rear open end of said housing, said protection boot having a front end engaged with said stopper inside said housing, and having flexibility which restricts bending of the optical fiber cable to an allowable limit;
   wherein said stopper includes a plurality of integrally-formed protection arms which extend through the rear open end of said housing, said protection arms being arranged outside said protection boot in a manner that allows the optical fiber cable and said protection boot to bend.

2. The optical connector according to claim 1, wherein the optical fiber cable is in the form of a ribbon including a plurality of optical fibers, and said protection arms are adapted to extend along both side-edges of the optical fiber ribbon.

3. An optical connector attached to an end of an optical fiber cable, the optical fiber cable including an optical fiber, the optical connector comprising:
   a housing having a front open end and a rear open end;
   a ferrule arranged in said housing on a front open end side of said housing, the optical fiber cable being connected with said ferrule at one end thereof by means of the optical fiber and extending out of said housing through the rear open end;
   a holding assembly for holding said ferrule in said housing, said holding assembly including a stopper arranged in said housing on a rear open end side of said housing; and
   a protection boot adapted to surround the optical fiber cable over a predetermined length from the rear open end of said housing, said protection boot having a front end engaged with said stopper inside said housing and having flexibility which restricts bending of the optical fiber cable to an allowable limit;
   wherein said stopper includes a boss fitted into a front end of said protection boot, and a stopping surface adapted to abut on the front end face of said protection boot.

4. The optical connector according to claim 3, wherein said stopper further includes an annular groove formed in an outer circumferential surface of said boss, and said protection boot has an inner flange formed at the front end of said protection boot and fitted into said annular groove of said boss.

5. The optical connector according to claim 3, wherein said stopper further includes a plurality of integrally-formed protection arms which extend through the rear open end of said housing, said protection arms being arranged outside said protection boot in a manner that allows the optical fiber cable and said protection boot to bend.

6. The optical connector according to claim 5, wherein each of said protection arms has a proximal part adapted to compress the front end of said protection boot, in cooperation with said boss.

7. The optical connector according to claim 5, wherein said stopper further includes a support member adapted to connect said protection arms, said support member having an abutting surface opposite to said stopping surface, and said protection boot has a convex portion formed on an outer circumferential surface of the front end of said protection boot, said convex portion being held between said stopping surface of said stopper and said abutting surface.

8. The optical connector according to claim 7, wherein said support member is arranged to close said rear open end from the outside of said housing and has a through-hole allowing the front end of said protection boot to pass through.

* * * * *